United States Patent [19]

Waters

[11] Patent Number: 5,540,589

[45] Date of Patent: Jul. 30, 1996

[54] AUDIO INTERACTIVE TUTOR

[75] Inventor: Richard C. Waters, Concord, Mass.

[73] Assignee: Mitsubishi Electric Information Technology Center, Cambridge, Mass.

[21] Appl. No.: 225,664

[22] Filed: Apr. 11, 1994

[51] Int. Cl.$^6$ .................................................. G09B 19/00
[52] U.S. Cl. .......................... 434/156; 434/118; 434/169; 434/185; 381/51; 395/2.55; 364/419.01
[58] Field of Search .................................... 434/118, 186, 434/169, 185, 308, 319–321, 323, 327, 350, 362, 365, 157, 167; 364/419.01–419.03, 419.2; 395/2, 2.4, 2.55, 23, 2.84, 10, 152, 154; 381/51, 48

[56] References Cited

U.S. PATENT DOCUMENTS

| | | | |
|---|---|---|---|
| 5,111,409 | 5/1992 | Gasper et al. | 395/152 |
| 5,142,657 | 8/1992 | Ezawa et al. | 381/48 |
| 5,302,132 | 4/1994 | Corder | 434/169 X |
| 5,340,316 | 8/1994 | Javkin et al. | 434/185 |
| 5,393,236 | 2/1995 | Blackmer et al. | 434/169 |
| 5,398,302 | 3/1995 | Thrift | 395/23 |
| 5,487,671 | 1/1996 | Shpiro et al. | 364/419.01 X |

FOREIGN PATENT DOCUMENTS 2-216182   8/1990   Japan .
2-302787  12/1990   Japan .
3-226785  10/1991   Japan .

*Primary Examiner*—Joe Cheng
*Attorney, Agent, or Firm*—Robert K. Tendler, Esq.

[57] ABSTRACT

An all-audio, hands-free and eyes-free interactive tutor provides time-efficient and reduced-boredom instruction by varying a course of instruction based on the correct and incorrect responses of the user so as to frequently repeat and provide positive feedback for poorly-learned items of knowledge, to periodically refresh well-learned items and to suggest that rest be taken or to switch to easier material whenever too many human errors have occurred. The audio interactive tutor includes an audio input module, in the preferred embodiment a voice recognition unit based on a finite state grammar, an audio output module, a course of study and a user model. In a preferred embodiment, the course of study provides for human error control as well as for voice recognition unit error control, which synergistically cooperate to render the tutor substantially fault-tolerant and therewith enables the employment of commercially-available but not excessively accurate voice recognition units. The tutor may be embodied to operate on a PC or workstation, or may be embodied to operate as a stand-alone tutor. Spanish language instruction is disclosed in an exemplary embodiment.

22 Claims, 5 Drawing Sheets

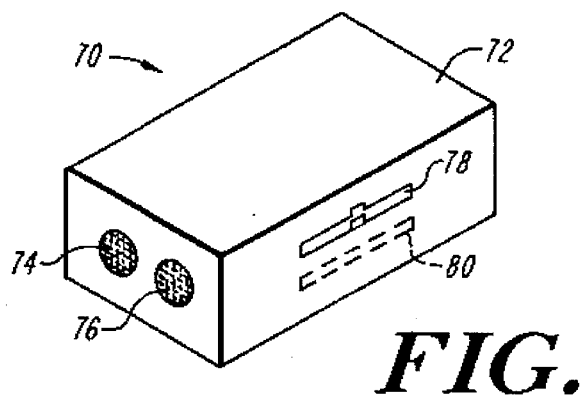
FIG. 2C
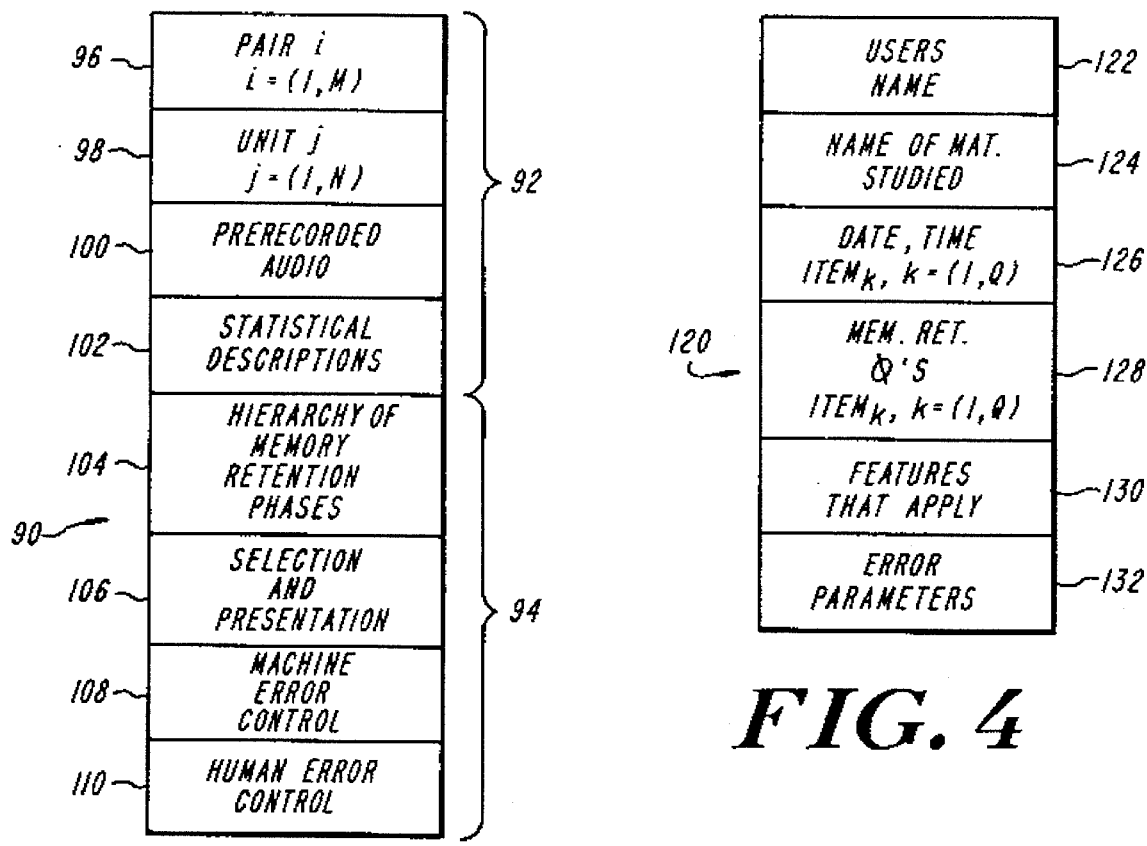
FIG. 3
FIG. 4

5,540,589

AUDIO INTERACTIVE TUTOR

FIELD OF THE INVENTION

This invention is drawn to the field of intelligent computer aided instruction, and more particularly, to a novel audio interactive tutor.

BACKGROUND OF THE INVENTION

Many domains of knowledge may be represented as a collection of items or facts to be learned. Devices and techniques that are designed to allow learning of the items or facts to occur must present the items. Presentation alone, however, is not enough. Learning involves both knowledge and memory retention, as well as keeping the user's interest at an acceptable level. Boredom and the other moods that may block effective learning and/or inhibit the user from seeing through the course of study in the prescribed manner must be combatted.

There are many kinds of computer supported and other tools for learning. Most computer supported tools are based on typed interaction. Those that provide audio are of two types. The first, typified by self-study tapes, provides for audio output but does not accept audio input from the user. The second type, of which there are only a few examples, supports audio output and input.

With respect to self-study tapes, a particularly good example are those devised by Dr. Paul Pimsleur. As disclosed in a document entitled "Speak & Read Essential Spanish," by Paul Pimsleur, (Heinle & Heinle Enterprises, Inc. Publishers, 1988), the information on Pimsleurs' self-study tapes is organized on the basis of two main principles called "Anticipation" and "Graded Interval Recall". Anticipation is intended to avoid the dulling effect of mere repetition by recording information on the tapes in a form that requires the student to anticipate a correct response before it is announced by the tapes rather than to merely repeat something already announced. Graded Interval Recall is intended to avoid inefficient memorization by recording information on the tapes at graduated intervals that remind the student of information at the times when they would otherwise forget it. Items are thereby taught that form the bedrock for other items and repeated intensively at first, until knowledge of them resides in short term memory, and are thereafter repeated at ever greater intervals, until knowledge of them resides in long term memory.

The basic study cycle of self-study tapes, including Pimsleurs, consists of audio, silence, audio, silence. Typically, an instructor says something, either in the foreign language or in the user's native language, that calls for a response from the user, usually in the foreign language. There is a period of silence for the user to provide a spoken response, which may be in a form called by for the principle of anticipation. So that a non-native speaker can be given the correct pronunciation, a native speaker then provides a correct response, and thereafter there is a period of silence in which the user can assess the correctness of his own response, and repeat the correct response.

Self-study tapes in general have the advantage that they are inexpensive, typically costing only a few hundred dollars for a set, and can be used in a wide variety of situations. However, they are limited in their effectiveness by inflexibility and a lack of feedback. The fundamental problem is that self-study tapes have no way of assessing whether the user has made a correct response, or for that matter, any response at all. As a result, they cannot provide feedback about correctness to the user. They also have no choice but to follow a single fixed pattern of instruction.

The lack of feedback is troublesome in many ways. First, it can be quite hard for users to decide whether or not they are correct. For instance, it can be hard for a user's untrained ear to hear subtle differences. In addition, there is often more than one correct response. Therefore, the mere fact that a user's response was different from the response on the tape does not necessarily mean that the user was wrong.

The lack of flexibility is an even greater difficulty. Self-study tapes must contain significant repetition to be effective. In fact, users typically have to listen to a set of tapes several times for good learning to occur. Unfortunately, since the repetition is fixed, it cannot be varied based on what the user is and is not succeeding in learning. Inevitably, much of the repetition involves things that were easy for the user to learn and is therefore a waste of time. On the other side of the coin, there are inevitably things that the user finds hard to learn that fail to get repeated often enough.

With regard to devices that support audio input as well as output, there are several examples. One voice-recognition based instructional device, the Summit Literacy Tutor, described in a document entitled "Word Rejection For a Literacy Tutor", SB Thesis, (MIT, 1992), by McCandless, is designed for teaching people to read English and includes a speech synthesizer and a speech recognition system called Summit described in a document entitled "The Summit Speech Recognition System; Phonological Modeling and Lexical Access", Proc. ICASSP, (pp. 49–52, Alburquerque N.Mex., April 1990), by Zue, et al. The Summit literacy Tutor uses Summit to monitor a person who is reading aloud, detects pronunciation errors when they occur, and using the speech synthesizer, pronounces words and sentences when requested by the user. The Summit Literacy Tutor merely monitors what the user chooses to read but does it without regard for what may be read next or for whether the user knows or retains in memory what is read.

Another voice-recognition based instructional device, the Summit Language Tutor, described in a document entitled "Language Tutor: An Interactive Aid for Teaching English and Japanese", in Annual Research Summary, Spoken Language Systems Group, MIT Laboratory for Computer Science (Nov 1993), V. Zue (editor), is designed for teaching people to properly pronounce previously written sentences. The Summit Language Tutor includes a speech synthesizer and the Summit voice recognizer. The Summit Language Tutor uses the speech synthesizer to read the sentences aloud, and uses Summit to monitor the user's responses, should the user choose to read the sentences. Like the Summit Literacy Tutor, the Summit Language Tutor merely monitors the pronunciation of the previously written sentences should the user choose to pronounce them but without regard for whether the user knows or has retained in memory the previously written sentences. In one mode, the Summit Language Tutor can select at random a sentence as a test, but beyond that, it has no regard for what is to be read next, which is left to the freedom of the user.

Another voice-recognition based instructional device, the SRI Autograder system, described in a document entitled "Speech Recognition Technology For Language Education", Speech Research & Technology Program note, (SRI International, November 1993), by Bernstein, is designed to allow people to determine how well they have spoken a foreign language utterance. The Autograder system includes a voice recognition unit called Decipher described in a document entitled "The Decipher Speech Recognition System" Proc IEEE ICASSP, (pp. 77–80 1990), by Cohen et al. The Autograder system uses Decipher to assign a score that represents how accurately and how fluently a user has uttered a phrase but it makes no attempt whatsoever to teach any items of knowledge.

Another voice-recognition based instructional device, the SRI VILI system, also described in the document by Bernstein, supra, is designed to enable people to have a dialog in a foreign language and includes a database of stored utterances, a dialog grammar and the Decipher voice recognition unit. The SRI VILI system uses the dialog grammar and the Decipher system to recognize which response the user has selected of several possible responses allowed at a typical moment by the dialog grammar and varies the course of the dialog to the selection made. The SRI VILI system only selects that which is to be spoken next in response to which selection was made. Beyond that, it has no regard for whether the user knows or retains in memory what has been said.

The above voice-recognition based instructional devices are deficient in that they are costly laboratory prototypes ill-suited for commercial use. In addition, they are unable to select what is to be next presented with sufficient intelligence to prevent unnecessary and time-consuming repetition, user boredom and the other moods that prevent effective learning, and do not vary the course of study in dependance on what the user did or did not know. Moreover, they fail to provide for human and voice recognition machine errors.

SUMMARY OF THE INVENTION

It is accordingly the principal object of the present invention to provide an intelligent interactive tutor that simulates an intelligent instructional dialogue whose course of audible statement and oral reply so varies itself confirming and reinforcing correct replies and correcting and repeating incorrect replies that the user is allowed to effectively and efficiently progress without boredom through the items to be learned. The intelligent instructional dialogue's course of audible statement and oral reply simulated by the audio interactive tutor of the present invention cognitively engages the user, allowing learning to occur, and is best suited to allow those domains of knowledge to be learned that can be represented as spoken propositions. Exemplary but not limiting examples of such domains are law, music, medicine and language instruction. The course of audible statement and oral reply may be punctuated, as appropriate, with other audible material, such as music. Non-audible material that can support oral reply, such as visually presentable material, can be added without departing from the inventive concepts.

The audio interactive tutor of the present invention is configured in one embodiment to operate as a portable, special-purpose device already dedicated to a predetermined domain of knowledge, is configured in another embodiment to operate as a portable, special-purpose device that may be dedicated to different, user-selected domains of knowledge and is configured in another embodiment to operate with a general purpose device, such as a personal computer or a workstation. In any embodiment, the audio interactive tutor of the present invention provides eyes- free, hands-free operation, which, especially in the case of the portable, special-purpose device embodiments, enable its use while engaging in another task, such as driving an automobile or other vehicle.

Output audio means are disclosed for presenting the audible statements in the intelligent instructional dialogue's course of audible statement and oral reply and input audio means are disclosed for recognizing the oral replies in the intelligent instructional dialogue's course of audible statement and oral reply. The output audio means may present any audible statement, such as questions and commands, as well as other audio, such as music. The output audio means in the preferred embodiment includes a D/A converter and an output transducer, although other output audio means, such as a speech synthesizer, may be employed without departing from the inventive concepts. The input audio means in the preferred embodiment includes a voice recognition unit, an A/D converter and an input transducer. In the preferred embodiment, the voice recognition module includes a finite state grammar speech recognizer that operates in real-time, although other voice recognition units may be employed without departing from the inventive concepts.

Means are disclosed for specifying course material, e.g., the particular items of the domain of knowledge to be learned, and, among other things, for specifying memory retention phases or levels, and control information. In the preferred embodiment, the memory retention phases are specified as a learning and memory retention hierarchy data structure. The learning and memory retention hierarchy is preferably ordered in two series, one series representing memory retention phases whereat any item is still not current in human memory and the other series representing memory retention phases whereat any items are already current in human memory. Each series is itself preferably ordered into higher and lower and intermediate phases that index practice intervals specifying comparatively more and comparatively less intensive practice.

Means are also disclosed for specifying a user model, that specifies, among other things, which items of knowledge the user has already demonstrated correct and incorrect knowledge of and the phase of knowledge and memory retention for each item already attained by the user. In the preferred embodiment, any queriable features that are user-dependent and/or user-settable are specified by the user model data structure means.

The user model and the course of study cooperate to provide an intelligent interactive dialogue that varies the course of audible statement and oral reply so that the user is allowed to effectively and efficiently progress through the items of knowledge to be learned, practicing lesser-known and retained items more intensively and better known and retained items less intensively, in dependence on the user's temporal history of correct and incorrect replies.

According to one aspect of the disclosed and claimed invention, human error control information is specified by the course of study means and user-settable error parameters are specified and kept by the user model means. In the preferred embodiment, the user-settable error parameters include a short-term and a long-term error parameter. The short-term error parameter preferably represents a moving average of user mistakes, which is compared to a short-term user- selected error tolerance, and the long-term error parameter preferably represents the number of times the short-term error parameter has exceeded the short-term error tolerance, which is compared to a long-term preset error tolerance. The course of statement and reply is so varied in accord with whether or not the comparisons exceed the thresholds established by the error tolerances as to switch either to easier material or to suggest that the present dialogue be terminated. Either way, rest may be taken to allow for a restoration of the user's performance.

According to another aspect of the disclosed and claimed invention, unit error control information is specified by the course of study means. In the preferred embodiment, the hierarchy of memory retention phases is ordered into a higher and a lower series of phases, and the phases of the higher and lower series are themselves ordered into higher, intermediate and lower phases. Whenever incorrect knowledge of an item of knowledge is indicated by an apparently erroneous reply, the course of study data structure means defines a predetermined jumped change in phase determined such that, if the present phase of the item is a higher phase on either the higher or the lower series, it lumps to the lowest phase on that series and skips any intermediate phases there may be, if the present phase is the lowest phase on the higher series, it jumps to the lowest phase on the lower series, and, if the present phase of the item is the lowest phase on the lower series, it jumps to "null".

According to one advantage of the presently preferred embodiment, on one hand, the human error control, and on the other, the voice recognition unit error control aspects of the disclosed and claimed invention, synergistically enables the audio interactive tutor of the present invention to be relatively insensitive to voice recognition unit errors. As long as the voice recognizer is correct more often than it is incorrect, the memory retention phases will converge on appropriate values. In this way, the audio interactive tutor of the present invention may be readily embodied by means of the present generation of commercially-available, but not excessively accurate, speech recognition technology.

An exemplary embodiment of an intelligent Spanish language audio interactive tutor is disclosed.

BRIEF DESCRIPTION OF THE DRAWINGS

Other objects, features and advantages of the present invention may become apparent to those of skill in the art by reference to the following detailed description of the preferred embodiments, and to the drawings, wherein:

FIG. 3 illustrates a course of study data structure of the audio interactive tutor of the present invention;

FIG. 4 illustrates a user model data structure of the audio interactive tutor of the present invention;

DETAILED DESCRIPTION OF THE PREFERRED EMBODIMENTS

Figure 1:
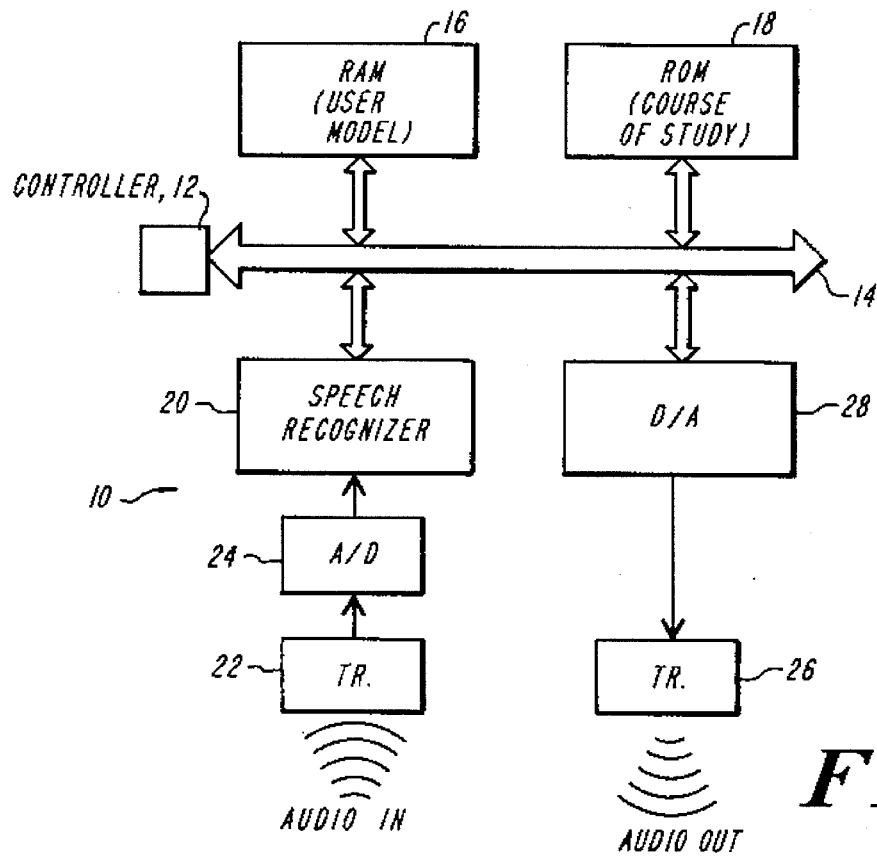
FIG. 1 is a block diagram of the audio interactive tutor of the present invention.

Referring now to FIG. 1, generally designated at 10 is a block diagram of the audio interactive tutor of the present invention. The audio interactive tutor 10 includes a controller 12 operatively coupled to an address and data bus 14. RAM memory 16 defining a user model data structure to be described and ROM member 18 defining a course of study data structure to be described are operatively coupled to the address and data bus 14 of the controller 12. A speech recognition unit 20, connected to an input audio transducer 22 via an analog to digital converter 24, is operatively coupled to the address and data bus 14 of the controller 12. An output audio transducer 26 is connected to a digital to analog converter 28 that, in turn, is operatively coupled to the address and data bus 14 of the controller 12. In the preferred embodiment, I/O is purely audio, the transducer 26 providing output statements audible to the user and the transducer 22 receiving any oral responses that the user may utter in response to the output audible statements.

Figure 2A:
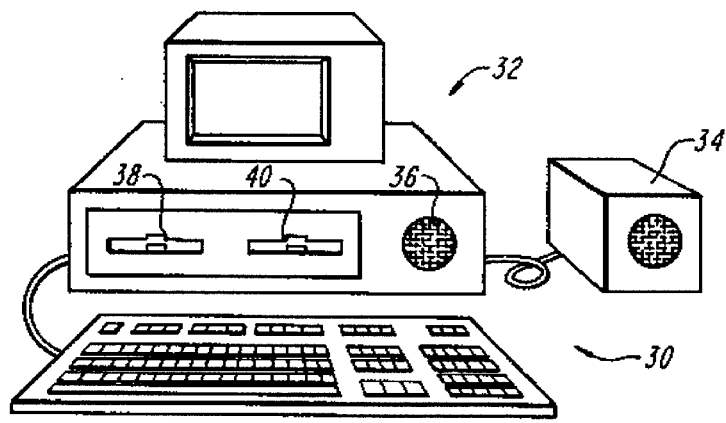
FIG. 2 illustrates in the FIGS. 2A, 2B and 2C thereof alternative embodiments of the audio interactive tutor of the present invention.
Figure 2B:
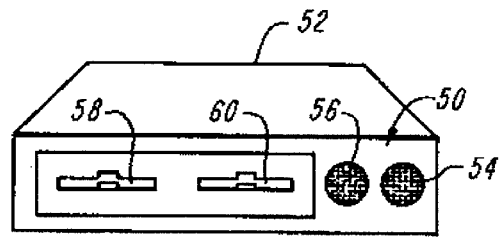

Referring now to FIG. 2, generally designated at 30 in FIG. 2A, at 50 in FIG. 2B and at 70 in FIG. 2C are alternative embodiments of the audio interactive tutor of the present invention. The embodiment 30 of FIG. 2A is configured as general-purpose controller 32, such as a PC or a workstation, to which a voice recognizer 34 is operatively connected. The voice recognizer 34 is illustrated as a stand-alone component, although it may be built-in to the controller 32 without departing from the inventive concepts. The controller 32 has an output audio speaker 36. The output audio speaker is illustrated as built-in thereto, although the output audio speaker 36 may be provided as a stand-alone component without departing from the inventive concepts. The general-purpose processing unit 32 has a RAM drive 38 and a ROM drive 40. The RAM drive 38 receives a portable, non-volatile diskette having the user model data structure to be described in accord with the audio interactive tutor of the present invention and the ROM drive 40 receives a portable, non-volatile ROM diskette having the course of study data structure to be described in accord with the audio interactive tutor of the present invention. As illustrated, an output video display and a keyboard may be employed, where the same may supplement the primarily audio interaction provided by the audio interactive tutor of the present invention, without departing from the inventive concepts.

The embodiment 50 of FIG. 2B is configured as a special-purpose device capable of simulating an intelligent instructional dialogue for any selected domain of study. The embodiment 50 includes a special-purpose controller 52 having an output audio module 54 and an input audio module 56. The input audio module is preferably a voice recognition unit and the output audio module 54 is preferably a transducer, although other input and output modules may be employed without departing from the inventive concepts. The dedicated, special-purposes controller 52 of the embodiment 50 has a RAM reader 58 and a ROM reader 60 that respectively receive portable, non-volatile RAM and ROM diskettes having the user model data structure and course of study data structure to be described of the audio interactive tutor of the present invention. Device 52 of the embodiment 50 is relatively small in size and low in weight so that it is able to be used in a portable manner.

The embodiment 70 of FIG. 2C includes a dedicated, special-purpose controller 72 and, like the embodiment 50 of FIG. 2B, it includes an audio output module 74, an audio input module 76, and a RAM reader 78 that receives a portable, non-volatile RAM diskette having the user model data structure to be described of the audio interactive tutor of the present invention. The embodiment 70 of FIG. 2C differs from the embodiment 50 of FIG. 2B in that the embodiment 70 has a built-in ROM memory storage device 80 that is already dedicated to a particular domain of study, such as language instruction.

Referring now to FIG. 3, generally designated at 90 is the course of study data structure of the audio interactive tutor of the present invention. The course of study data structure 90 includes a specification of a particular domain of study, as illustrated by a bracket 92, and a specification of a particular tutoring strategy, as illustrated by a bracket 94. The domain of study data structure 92 in the preferred embodiment specifies pairs 96, units 98, prerecorded audio 100 and statistical descriptions 102. The pairs 96 and the units 98 specify what is to be studied, the prerecorded audio 100 specifies the various statements and the statistical descriptions 102 specify for the presently preferred finite state grammar voice recognition unit the various expected replies of the course of statement and reply of the intelligent instructional dialogue simulated by the audio interactive tutor of the present invention. The pairs 96 of the course of study data structure 90 each consist of a stimulus and a response. The stimulus is played by the audio output module and the expected response is recognized by the input audio voice recognizer of any embodiment of the intelligent, audio interactive tutor of the present invention. Each stimulus of a pair preferably specifies the following data structure:

Name—a unique identifying name used when referring to it from other pairs.

Stand-alone—the value True if the pair can be used in isolation, as opposed to as part of a unit, described below.

Features—a list of zero or more features that must be true of the user in order for this pair to be applicable.

Requires—names of the items that must be current for the user in a manner described below, if this pair is to be used. It is assumed that it is confusing to be teaching or practicing too many things at once. Rather, each pair should teach or practice only a couple of things, but can do so utilizing arbitrarily many other things the user knows well.

Teaches—names of the items taught, if any. Many pairs are just for practice and don't teach anything.

Practices—names of the items other than any required items that will be practiced in correct responses to this pair.

Stimulus—a segment of prerecorded sound to present to the user, such as a description or question.

Secondary-stimulus—a segment of prerecorded sound that will be presented to the user if the primary stimulus evokes no response.

Continuation—any optional action to perform immediately after the pair has been presented to the user and the user has responded. This is either one of a few special system actions like stopping the lesson, or the name of another pair to present to the user. The primary use of continuations is to chain sets of pairs together into groups.

Responses—a list of responses expected from the user. Typically only a few and, preferably, not more than ten (10) or so. It is possible for there to be no responses. In that case, the stimulus is assumed to merely impart information to the user and no response is expected.

By allowing in the presently preferred embodiment for only a small number of very specific expected responses, as represented by the statistical descriptions that correspond to the finite state grammar, speech recognition is able to be implemented in a straightforward manner in the current state of the art. The speech recognizer module in any embodiment is able thereby to determine whether a given response is correct without understanding what the response means, by merely comparing it with the expected responses. Each response of a stimulus/response pair preferably specifies the following data structure:

Validity—an indicator specifying whether the response is valid, invalid, or neutral. Neutral responses are neither correct nor incorrect. They are used only in special situations e.g., when determining "features" of the user to be described.

Phrase—a statistical model of the expected response that can be used by the speech recognizer. If there are any responses for a pair, exactly one is given a special null model, which indicates that the response is a catchall that is selected when none of the other responses for a pair can be recognized.

Correct items—names of items the response indicates correct knowledge of. The practices field of a pair is typically the intersection of the correct items fields of its valid responses.

Incorrect items—names of items the response indicates incorrect knowledge of.

Action—an optional action to perform if the user makes this response. This is either one of a few special system actions like terminating the session, or the name of another pair to present to the user, e.g. to reinforce the response or make a correction.

To be tolerant of errors in its speech recognizer, it is preferred that the actions associated with responses be chosen so that they are not jarring in situations where a response is incorrectly recognized. In particular, if the action for an invalid response merely focuses on demonstrating a correct response, it is unlikely to upset the user even if incorrectly recognized. In contrast, an action that is critical of the user could be quite upsetting.

The units data structure 98 of the course of study data structure 90 specifies groups of stimulus response pairs that belong together and form a teaching unit. A unit specifies the following data structure:

Name—a unique identifying name.

Pairs—an ordered list of the names of the pairs in the unit. Typically, many of these pairs will not be stand-alone pairs; however, many may be.

Requires, teaches, practices—names of items just as in a pair. These fields are the union of the corresponding fields of the pairs in the unit.

A unit is presented by presenting its pairs in order, one after the other and, as appears more fully hereinbelow, unless the user makes a great many errors, the audio interactive tutor of the present invention will push right on through the whole unit. Even if the user gets an answer wrong, hearing the correct response and then repeating it may be sufficient teaching. Even if it is not, just plowing right on is often a better thing to do than demanding perfection at each step. Further, this approach makes the audio interactive tutor of the present invention less sensitive to speech recognition errors.

The prerecorded audio data structure 100 and the statistical descriptions data structure 102 of the course of study data structure 90 specify the audio output and statistical descriptions representative of expected replies for corresponding ones of the stimulus/response pairs of the pairs data structure 96 and units data structure 98. Even if limited to telephone quality and highly compressed, recorded speech requires about thirteen (13) kilo-bits of memory per second and six (6) mega-bytes per hour. The statistical descriptions required for speech recognition can be considerably larger. However, given that a CD-ROM holds six-hundred (600) mega-bytes, each CD-ROM is able to hold several hours of instructional material which can support hundreds of hours of instruction, allowing for pauses and repetition.

The tutoring strategy data structure 94 preferably includes a data structure 104 specifying a hierarchy of memory retention phases, a data structure 106 specifying selection and presentation of pairs, a data structure 108 specifying unit error control, and a data structure 110 specifying human error control. The hierarchy of memory retention phases data structure 104 preferably specifies two (2) series of ordered memory retention phases. Each phase has an associated practice interval ten (10) minutes, one (1) week, etc. The first series represents that any item of knowledge is current in memory, so that its memory retention phases call for comparatively less frequent repetition to "cement" in memory any item of knowledge on that series, and the other series represents that any item of knowledge has yet to become current in memory, so that its memory phases call for comparatively more frequent repetition to allow any item of knowledge for that series to become "current" in memory. The hierarchy of memory retention phases of the preferred embodiment allows the user to learn the items of knowledge very rapidly, and efficiently, by specifying comparatively intense practice a predetermined number of times until those items are cemented in memory, and, thereafter, by specifying for those same items comparatively less intensive practice or predetermined number of times to keep those items refreshed in memory. In this manner, inefficiencies and user boredom are avoided and effective progress through the material to be learned is enabled. The number of phases of each of the series is to some extent arbitrary, the number of levels need only be selected to provide that amount of staged repetition thought necessary either to let items of knowledge become current in memory or to let items of knowledge already current in memory to become cemented in memory. The hierarchy of memory retention phases data structure 104 in the preferred embodiment specifies a "null" phase that is an initialization phase that the items of knowledge of the domain of study are assigned prior to their having been taught. Any suitable manner of specifying the hierarchy of memory retention phases and practice intervals may be employed.

The selection and presentation data structure 106 of the tutoring strategy data structure 94 specifies the manner of selecting which items are to be selected and how the selected items are to be presented to the user. In the preferred embodiment, the selection/presentation data structure 106 specifies the assignment of utilities to the items of knowledge to enable the selection of pairs and/or units having the highest utilities for presentation. Any suitable selection and presentation data structure may be employed without departing from the inventive concepts.

The unit error control data structure 108 of the tutoring strategy data structure 94 of the course of study data structure 90 specifies the manner that the memory retention phases are to be assigned in the event that correct and incorrect knowledge of an item of knowledge is indicated by an apparently correct and an apparently incorrect reply. In the preferred embodiment, a jump in memory retention phases from the current item's phase to a lower, but not the lowest, memory retention phase or null is specified in the event that the user gives an apparently incorrect reply. Ordinarily, absent unit error, incorrect knowledge of an item should be indicative that the time is not known and intensive practice at the lowest level or null should resume to allow it to be learned. By specifying a jump to an intermediate level, but not to the lowest level (or null), the effect of possible voice recognition unit error is cushioned. If there is unit error, the preselected intermediate level practice interval will not severely disrupt the learning process. Other unit error control techniques could be employed without departing from the inventive concepts.

The human error rate data structure 110 of the tutoring strategy data structure 94 specifies the manner that human errors are to be accommodated during the course of the audio interactive dialogue simulated by the instant invention. The human error control data structure 110 of the preferred embodiment provides for both a long-term and a short-term error parameter. The short-term error parameter preferably specifies a moving error average and a short-term error threshold and the long-term error parameter preferably specifies an acceptable number of times the moving error average can exceed a long-term error threshold. Other human error control data structures may be employed without departing from the inventive concepts. The presently preferred human error control data structure 110 allows for the presentation of material to proceed notwithstanding an acceptable level of short-term error performance, and it allows either for the termination of the session or for the switching to easier material in the event that the short-term error exceeds the long-term error threshold a predetermined number of times. In this manner, so long as the speech recognizer is correct more often than it is incorrect, the unit error and human error control data structures 108, 110 synergistically cooperate to render the audio interactive tutor of the present invention substantially tolerant to speech recognizer errors.

Referring now to FIG. 4, generally designated at 120 is the user model data structure in accord with the audio interactive tutor of the present invention. The user model data structure 120 includes a user's name data structure 122 that specifies the name of the user and a name of material studied data structure 124 that specifies the name of the particular domain under study. The user model data structure 120 further includes a date and time data structure 126 that specifies the date and the time that each item of knowledge has last been studied by the named user for the named studied material, for each item of knowledge of the domain of knowledge specified in the course of study data structure 90 (FIG. 3).

The user model data structure 120 also includes a memory retention phase data structure 128 that specifies, for each item of knowledge of the domain of study, the current memory retention phase attained by the user. Each level and memory retention phase is associated with a practice interval that specifies how often an item should be practiced. The audio interactive tutor of the present invention uses the practice intervals when deciding what to ask the user to practice when. For instance, suppose that it has been one week since the user last practiced some particular item. If the current memory retention phase for that item is associated with the practice interval of one week or less, the audio interactive tutor of the present invention will select study material that practices the item. Otherwise, it will avoid material that practices the item.

The user model data structure 120 includes a features data structure 130 that specifies characteristics of the domain of study that needs to be tailored to the characteristics of the user, such as user-settable and/or user-selectable preferences and/or inheritant properties of the user. Each feature and identifying name can take on one of a few specific values. What the relevant features and values are in any given set of study materials is specified as part of the course of study data structure 90 (FIG. 3). For an example of the use of features, consider that in many languages gender agreement means that male and female speakers have to say somewhat different things. As a result, the foreign language study material of the exemplary embodiment described hereinbelow contains a feature "gender", with the potential values "male" and "female", which is used to specialize the material for different users.

The user model data structure 120 includes an error parameter data structure 130 that specifies the short-term error used by the human error control data structure 110 of the course of study data structure 90 of FIG. 3. The short-term error parameter is user-selected, preferably as a feature, to allow the user to advance through material at a user-satisfactory error rate.

Any domain of study that can be represented as a collection of items of knowledge to be learned may be specified by the course of study data structure means 90 of FIG. 3. Any hierarchy of memory retention phases may be specified that allows effective and efficient progress of the user through the items of knowledge to be learned. By way of example, the domain of study of the course of study data structure 90 may specify Spanish language instruction and the following hierarchy of memory retention phases and practice intervals may be specified when studying language.

TABLE 1

| Phase | Practice Interval |
|---|---|
| −2 | 3 minutes |
| −1 | 10 minutes |
| 0 | 16 hours |
| 1 | 20 hours |
| 2 | 1 week |
| 3 | 2 weeks |
| 4 | 1 month |

The values were chosen under the assumption that the user would study once or twice a day for approximately thirty (30) minutes at each session. Correct response to the initial teaching of an item changes the items practice level to negative two (−2). If the user continues to practice the item correctly, then the knowledge level rises rapidly as follows. The level will reach zero (0) during the same lesson in which the item was first taught. The item will reach level one (1) after being practiced successfully the next day. If the user does not recall the item the next day, intensive practice will resume. For the table one above, the series of memory retention phases that represent that the items are not yet current in memory is the negative integers and zero (0), and the series that represents that any items are current in memory is represented by the positive integers. The null level is not specifically illustrated. An exemplary course of study data structure specifying Spanish language study defined by the Lisp study material definition language is illustrated in table two below.

TABLE 2

```
(define-pair teach-left
   :teaches (left)
   :stimulus "The word for left is 'izquierda'."
   :secondary-stimulus "Say 'izquierda'."
   :valid (("izquierda"))
   :invalid ((:otherwise    (pronounce  left
"iz-quier-da"))))
(define-pair practice-left
   :practices (left)
   stimulus "Say 'left'."
   valid (("izquierda")))
(define-feature :gender
   (query "Are you male or female?"
      (("male" '(add-feature :gender :male))
      ("female" '(add-feature :gender :female)))))
```

TABLE 2-continued

```
(define-unit teach-north-american-male-and I-am
   (define-pair teach-north-american male
      :teaches (north-american-male)
      :stimulus "A man from the United States is a 'norte
         americano'."
      :secondary-stimulus "Say 'norte americano'."
      :valid (("norte americano"))
      :invalid ((:otherwise (pronounce north-american-male
         "norte -ameri-cano"))))
   (define-pair teach-I-am
      :teaches (I-am)
      :stimulus "I am is 'soy'."
      :secondary-stimulus "Say 'soy'."
      :valid (("soy")))
   (define-pair male-practice-I-am
      :features (:male)
      :stand-alone t
      :practices (I-am north-american-male)
      :stimulus "Say 'I am from the United States'."
      :valid (("Soy norte americano.")
         ("Yo soy norte americano."
         (usually-no-pronoun "Soy norte americano.")))
      :invalid (("Soy norte americana."
         (refers-to-woman "Soy norte americano."))
         ("Yo soy norte americana."
         (refers-to-woman "Soy norte americano."))))
```

A macro expansion compilation process converts the definition of a set of study material into an internal representation that is convenient for the controller of the audio interactive tutor of the present invention.

The first form in Table two defines a stimulus/response pair teach-left that teaches the Spanish word for left. The macro define-pair provides a convenient syntax for specifying the various pieces of information that the controller needs to know about stimulus/response pairs. The definition is rendered more concise through the use of intelligent defaults and macros that expand into groups of stimulus/response pairs. This is illustrated by Table three which shows the five stimulus/response pairs that result from the first form in Table two.

TABLE 3

```
(define-pair teach-left
   :stand-alone t :features nil :requires nil :teaches (left)
      :practices nil
   :stimulus "The word for left is 'izquierda'."
   :secondary-stimulus "Say izquierda'."
   :continuation nil
   :neutral (("pause" '(suspend-)))
   :valid (("izquierda" (do-pair 'reinforce-izquierda)))
   :invalid ((:otherwise    (do-pair
'repeat-izquierda-in-parts))))
(define-pair reinforce-izquierda
   :stand-alone nil :features nil : requires nil :teaches nil
      :practices nil
   :stimulus "izquierda"
   :secondary-stimulus nil
   :continuation nil
   :neutral (("pause" '(suspend-)))
   :valid (("izquierda" nil))
   :invalid ((:otherwise nil)))
(define-pair repeat-izquierda-in-parts
   :stand-alone nil :features nil :requires nil :teaches nil
      :practices nil
   :stimulus "Repeat 'izquierda' in parts. da [in izquierda]"
   :secondary-stimulus nil
   :continuation (do-pair 'repeat-quierda-in-izquierda)
   :neutral (("pause" '(suspend-)))
   :valid (("da [in izquierda]" nil))
   :invalid ((:otherwise nil)))
(define-pair repeat-quierda-in-izquierda
   :stand-alone nil :features nil :requires nil :teaches nil
      :practices nil
```

TABLE 3-continued

```
    :stimulus "quierda {in izquierda]"
    :secondary-stimulus nil
    :continuation (do-pair 'repeat-izquierda)
    :neutral (("pause" '(suspend-)))
    :valid (("quierda {in izquierda}: nil))
    :invalid ((:otherwise nil)))
(define-pair repeat izquierda
    :stand-alone nil :features nil :requires nil :teaches nil
        :practices (left)
    :stimulus "izquierda"
    :secondary-stimulus nil
    :continuation nil
    :neutral (("pause" '(suspend-)))
    :valid (("izquierda" nil))
    :invalid ((:otherwise nil)))
```

Starting at the top of Table three, it can be seen that it is assumed by default that a pair can be used alone unless explicitly stated otherwise. The features, requires, teaches, and practices fields default to empty lists. The stimulus must be present. The secondary stimulus defaults to the stimulus unless it is explicitly specified. By default there is no continuation.

The remaining part of a define-pair form specifies the responses that are expected. They are collected into three groups: valid, invalid, and neutral. Each group is a list of response specifications, which defaults to the empty list. Each response specification is a phrase the user might say and an action to perform if the response is encountered. Four kinds of defaulting occur.

First, it is assumed by default that a valid response has no incorrect items and has as correct items everything the pair as a whole teaches or practices. It is assumed by default that an invalid response has no correct items and has as incorrect items everything the pair as a whole teaches or practices.

Second, it is assumed that every pair allows "pause" as a neutral response. The purpose of this is to ensure that the user can allow the controller to pause in such a way that study can be resumed later without any discontinuity. The function suspend, interrupts the controller and waits for the user to either say "resume" in which the controller starts up again or "stop" in which case it halts. If the user says "resume", then the resumes where it left off by repeating the stimulus/response pair that was interrupted.

Third, the keyword :otherwise is used to indicate the response, if any, that has a null speech recognition model and will be assumed to have been given if no other response can be recognized. If no :otherwise response is specified, it is assumed that the :otherwise case is an invalid response.

Fourth, if there is no explicitly specified action to go with a response, one is generated as follows. If there is no action for an invalid response, a default action is created that demonstrates the first valid response to the user. If there is no action for a valid response, a default action is created that reinforces the response. The latter default can be seen in Table three where the second pair, reinforce-izquierda, is used to reinforce the correct response "izquierda". The function do-pair causes the controller to present a pair to the user.

The final feature of the first form in Table two is its use of the macro pronounce. This macro takes a word or phrase containing hyphens that break it into chunks and creates a sequence of stimulus/response pairs that guide the user through the pronunciation of the phrase one part at a time. In Table three it can be seen that this macro has generated a chain of three pairs that lead the user through the pronunciation of izquierda starting with just the last syllable and ending with the word as a whole. If the user succeeds in pronouncing the whole word at the end, this is counted as having correctly practiced the word.

The second form in Table two defines a pair practice-left that can be used to practice the word izquierda. It expands into the following:

```
(define-pair practice-left
    :stand-alone t :features nil :requires nil :teaches
nil
        :practices (left)
    :stimulus "Say 'left'."
    :secondary-stimulus "Say 'left'."
    :continuation nil
    :neutral (("pause" '(suspend-)))
    :valid (("izquierda" (do-pair
'reinforce-izquierda)))
    :invalid ((otherwise    (do-pair
'reinforce-izquierda))))
```

This makes use of the second pair in Table three. It illustrates the creation by default of a secondary stimulus and an invalid :otherwise response.

The third form in Table two defines a feature called gender that is used to parameterize the study material. It expands into the following:

```
(def-feature :gender '(do-pair 'are-you-male-or-female))
(define-pair are-you-male-or-female
    :stand-alone nil :features nil :requires nil :teaches
nil
        :practices nil
    :stimulus "Are you male or female?"
    :secondary-stimulus "Are you male or female?"
    :continuation nil
    :neutral (("pause" '(suspend-))
        ("male" '(add-feature :gender :male))
        ("female" '(add-feature :gender :female)))
        (: otherwise (redo-pair)))
```

The function def-feature defines a new kind of feature and specifies an action that should be performed to determine what feature value applies to the current user. The first time the user uses a set of study material, he/she will be queried to determine what features are appropriate. After that time, these features are remembered as part of the user model.

The macro query generates a stimulus/response pair that determines what feature is appropriate. It uses neutral responses and forces the user to specify a feature value before study can be continued. The function redo-pair causes the current pair to be presented again.

The last form in Table two is an instance of the macro define-unit, which groups three pairs together as a unit. Within the scope of define-unit, it is assumed by default that pairs cannot operate in a stand-alone way. In Table two, it is explicitly specified that the last of the three pairs in the unit can nevertheless be used by itself outside of the unit.

The first pair in the unit teaches the word used to refer to a man from the United States. The second pair teaches how to say "I am". Both pairs are closely analogous to the pair teach-left.

The third pair in the unit, male-practice-I-am, practices the two items taught earlier in the unit. An aspect of the pair is its use of features. In Spanish, gender agreement between subjects and predicate adjectives means that men and women have to say many things slightly differently. In current foreign language self-study tapes, this kind or problem leads to an unavoidable awkwardness since a fixed set of output is being presented to every user. However, in accord with the present invention one can parameterize the study material so that a given user only hears appropriate sentences.

The pair male-practice-I-am specifies that it should only be presented to male users. Although not shown in the table, there should be an analogous pair that is only presented to women.

The macro usually-no-pronoun generates an explanation that subject pronouns such as you are usually omitted when speaking Spanish. The macro refers-to-woman generates a pair that explains that a response is inappropriate for a man to make. The use of these macros here illustrates that the study material can contain explicit information that explains errors and is presented only if the errors actually occur.

One part of the study material compilation process is the creation of files that specify what the audio output and speech recognition modules have to do. The instructions for the audio output module are in the form of a list of utterances to be recorded, along with symbolic names, which are referred to by the internal compiled form of the study material. Table four shows the list of utterances corresponding to the pairs in Table three. This list consists of every stimulus and secondary stimulus in the pairs. Note that while "izquierda" only appears once in Table four, it is the stimulus for two different pairs.

TABLE 4

| | |
|---|---|
| (the-word-for-left | "The word for left is 'izquierda'.") |
| (say-izquierda | "Say 'izquierda'.") |
| (izquierda | "izquierda") |
| (quierda | "quierda [in izquierda]") |
| (repeat-izquierda | "Repeat 'izquierda in parts. da [in izquierda]") |

The instructions to the speech recognizer are in the form of a finite state grammar (FSG). The FSG segment corresponding to Table four is shown in Table five. It contains five (5) primitive word states corresponding to the five (5) different things the user can say. It contains five (5) compound states corresponding to the five (5) stimulus/response pairs in Table three.

TABLE 5

```
VOCAB "spanish.voc" STATE MAIN
    STATE "PAUSE"      WORD "pause";;
    STATE "IZQUIERDA" WORD "izquierda";;
    STATE "QUIERDA-IN-IZQUIREDA" WORD    "quierda    [in
izquireda]";;
    STATE "DA-IN-IZQUIREDA"    WORD "da [in izquierda]:;;
    STATE "TEACH-LEFT"           INCLUDE STATE "IZQUIREDA";
                                 INCLUDE STATE "PAUSE";;
    STATE "REINFORCE-IZQUIERDA" INCLUDE STATE "IZQUIERDA";
                                 INCLUDE STATE "PAUSE";;
    STATE "REPEAT-QUIERDA-IN-IZQUIERDA" INCLUDE
STATE"QUIERDA-
IN-IZQUIERDA:;
                                 INCLUDE STATE
"PAUSE";;
    STATE "REPEAT-IZQUIERDA-IN PARTS" INCLUDE STATE "DA-IN-
                                         IZQUIREDA";
                                         INCLUDE STATE "PAUSE"
    STATE "REPEAT-IZQUIERDA" INCLUDE STATE "IZQUIERDA";
                                 INCLUDE STATE "PAUSE";;
```

Figure 5:
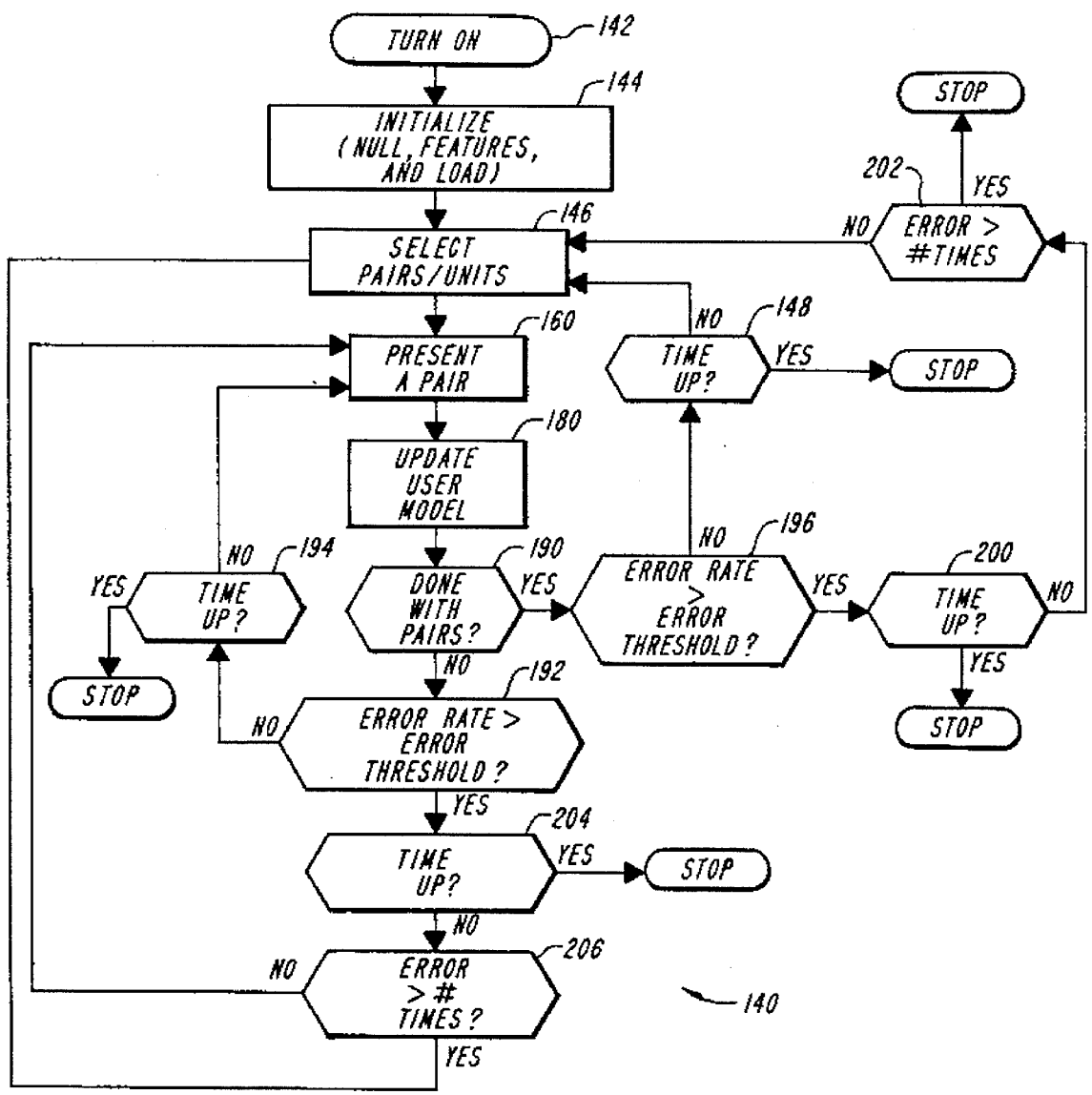
FIG. 5 is a flow chart illustrating the manner an exemplary embodiment of the audio interactive tutor in accord with the present invention intelligently simulates a Spanish language tutoring session.

As an example of how the information in Tables four and five is used, consider the following. When presenting the stimulus response pair reinforce-izquireda, the controller first asks the audio component to play the utterance izquierda. It then asks the speech recognizer to listen for one of the responses in the state REINFORCE-IZQUIERDA. Based on whether the user gives one of the expected responses, a response that cannot be recognized as one of the expected responses, or no response at all, the controller then decides what pair to present next. Referring now to FIG. 5, generally shown at 140 is a flow chart illustrating the operation of the exemplary embodiment of the audio interactive tutor of the present invention. As shown by the block 142, the system is turned on, and processing steps to a block 144. In the block 144, the controller initializes the system, querying any applicable features, setting to null any variables and loading the information specified by the user model and course of study data structures.

Figure 6:
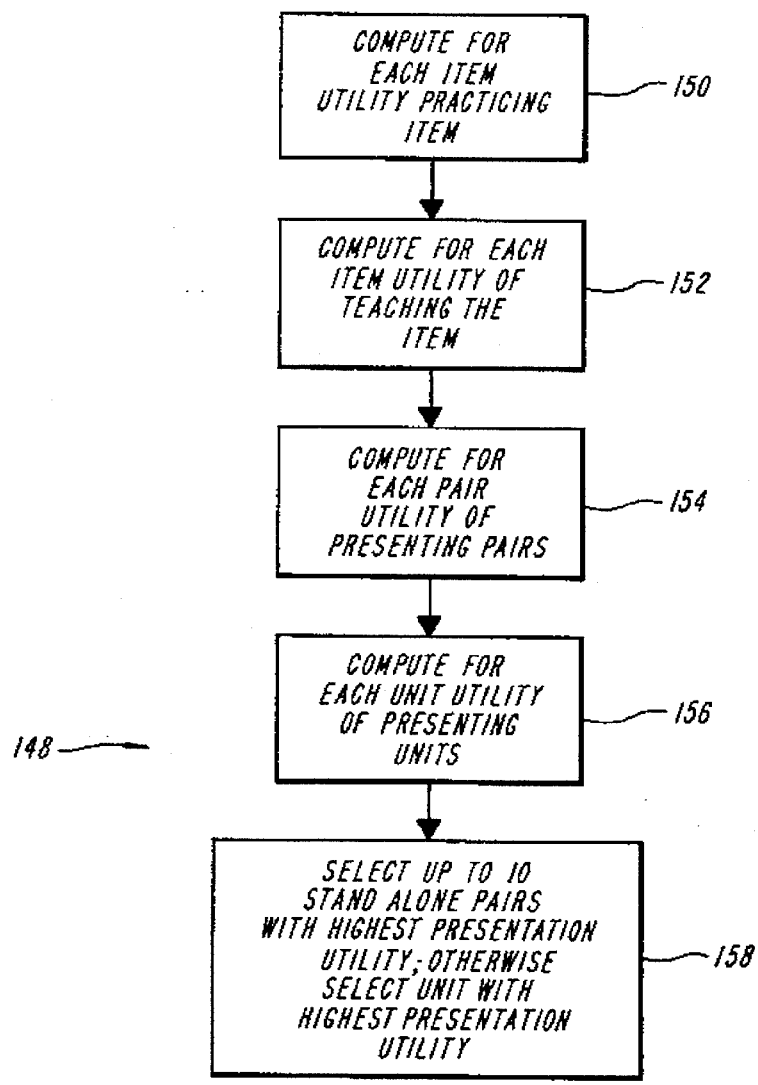
FIG. 6 is a flow chart illustrating a selection data structure of the exemplary embodiment of the audio interactive tutor in accord with the present invention.

As shown by a block 146, the controller then selects pairs and/or units for presentation. The selection process is specified as a part of the course of study data structure 90 (FIG. 3), and for the exemplary embodiment, is illustrated generally at 148 in FIG. 6. Referring to FIG. 6, as shown by a block 150, the controller is operative to compute for each item of knowledge to be learned the utility of practicing that item. If an item has not been taught, or its practice time is far in the future, the practice utility is negative. The utility rises as the practice time approaches, becoming very large if the desired practice time was missed a long time ago in comparison with the associated practice interval. For instance, if the desired practice interval was one day, and three days had passed since the last practice, the practice utility will be very high. Random noise may be introduced into the utility values in order to break ties and introduce greater variety.

As shown by a block 152, the controller is then operative to compute for each item the utility of teaching that item. This utility is negative if the item does not need to be taught. Otherwise, the utility depends on how many pairs refer to the item. An item that is used frequently is considered more important to teach. Random noise may be introduced to introduce greater variety and to break ties.

As shown by a block 154, the controller is next operative to compute for each pair the utility for presenting the pairs. The utility is negative if a pair cannot be presented because some required item is not current. It is also negative if the pair teaches an item that should not be taught or practices an item that does not need to be practiced. Beyond this, the utility of a pair is more or less the sum of the teaching utilities of the items it teaches and the practice utilities of the items it practices.

As shown by a block 156, the controller is next operative to compute for each unit the utility of presenting the units. The utility is negative if the unit cannot be presented because some pair in it cannot be presented. Beyond this, the utility of a unit is more or less the sum of the utilities of the pairs in it.

As shown by a block 158, the controller is next operative to select up to ten (10) stand-alone pairs with the highest presentation utility and, otherwise, to select the unit with the highest presentation utility. The controller selects what items to present by considering the unit with the highest positive presentation utility, if any-. If there are stand-alone pairs that have higher individual utilities than this best unit, the controller preferably selects up to ten (10) of them for presentation. Otherwise it presents the best unit, if any. If there are no units or pairs with positive utility, the controller terminates study. With study material of realistic size, this situation should never arise.

Figure 7:
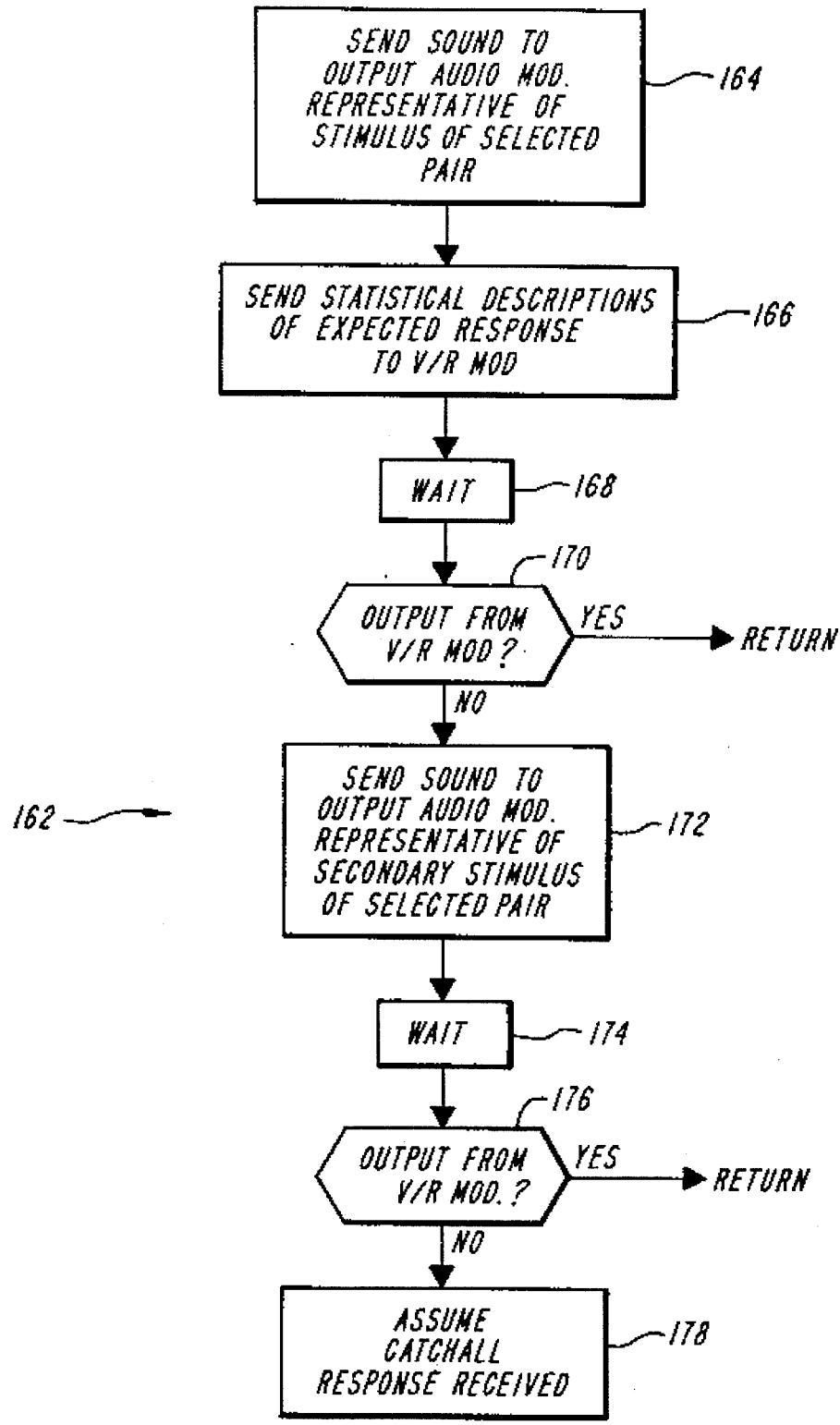
FIG. 7 is a flow chart illustrating a presentation data structure of the exemplary embodiment of the audio interactive tutor in accord with the present invention.

Returning now to FIG. 5, the controller next presents the pairs selected for presentation as shown by a block 160. The manner that the controller presents selected pairs is specified as part of the course of study data structure 90 (FIG. 3) and is illustrated generally at 162 in FIG. 7 for the exemplary embodiment. Referring to FIG. 7, the controller is operative as shown by a block 164 to send the prerecorded audio representative of the stimulus of the pair selected for presentation to the output audio module.

As shown by a block 166, the controller is next operative to send the statistical descriptions representative of the one or more responses expected for the stimulus of the pair selected to the voice recognition module. The finite state grammar voice recognition module uses the statistical descriptions to determine whether the user's reply corresponds to the expected responses for the selected stimulus in a manner well-known to those of skill in the art.

As shown by a block 168, the controller then waits to allow the user to reply to the selected stimulus.

As shown by a block 170, processing is returned to block 160 (FIG. 5) in the event there is an output from the voice recognition module and, in the event that there is no output from the voice recognition module, the controller sends the prerecorded audio to the output audio module representative of the secondary stimulus of the selected stimulus response pair, and waits for a response as shown by a block 174.

As shown by block 176, in the event that there is a reply from the user, processing is returned to the block 160 (FIG. 5), and if not, as shown by a block 178, the controller assumes that the catchall response has been received.

Returning now once again to FIG. 5, the controller, in dependence upon whether the oral reply by the user to the stimulus of the selected pair demonstrates correct or incorrect knowledge of one or more items of knowledge to be learned, updates the user model as illustrated by a block 180. The procedure the controller implements to update the user model is specified as part of the course of study data structure 90 (FIG. 3), which, for the exemplary embodiment, is illustrated by a flow chart generally designated at 182 in FIG. 8.

Figure 8:
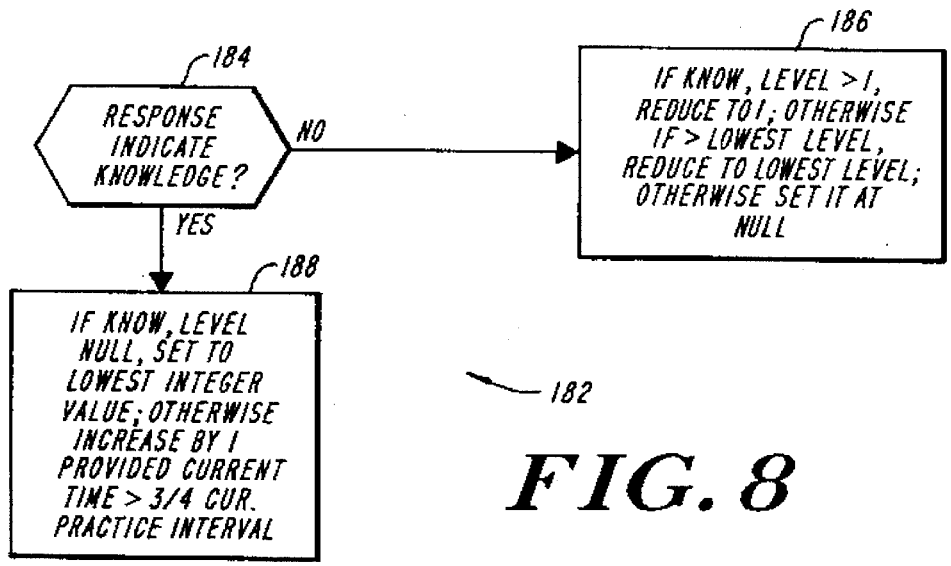
FIG. 8 is a flow chart illustrating a unit error data structure of the exemplary embodiment of the audio interactive tutor in accord with the present invention.

Referring now to FIG. 8, as shown by a block 184, in the event that the oral reply of the user does not correspond to one of the expected responses for the stimulus of the selected stimulus response pair presented, the memory retention phases are lowered for the corresponding one or more items of knowledge as follows. As shown by a block 186, in the event that the current memory retention phase of any corresponding item is greater than one (1), for the exemplary embodiment, the memory retention phase level is reduced to one (1); otherwise, if the memory retention phase is greater than the lowest knowledge memory retention phase it is reduced to the lowest level; and otherwise, it is set at the null value. In the event that the oral reply of the user demonstrates correct knowledge of one or more items of knowledge to be learned, as shown by a block 186, the memory retention phases are raised as follows. If the memory retention phase for which correct knowledge has been demonstrated is presently the null level, it is raised to the lowest integer value of the lowest series of the hierarchy of memory retention phases; otherwise, it is increased by one (1) phase provided that the current time exceeds three-quarters (¾) of the current practice interval. The condition of exceeding three-quarters (¾) of the current practice interval prevents accidental increases in memory retention phases. Of course, other percentages than the three-quarters (¾) percentage and other raising and lowering assignment schemes may be selected without departing from the inventive concepts.

Returning now to FIG. 5, the controller is next operative to determine whether it is finished presenting all of the pairs selected to be presented as illustrated by block 190, and if it is not, it is operative to determine whether the moving average of the user's history of demonstrating correct and incorrect knowledge exceeds the short-term error threshold as shown by block 192. In the event that the moving error average does not exceed the threshold and, as shown by a block 194, in the event that the time is not up for the current session, processing returns to the block 160 and the next pair of the pairs selected for presentation is presented.

In the event that the controller is finished with presenting the pairs selected to be presented and if the moving error average representative of the history of the user's demonstrating correct and incorrect knowledge of items of knowledge to be learned has not exceeded the short-term error threshold as shown by block 196, processing returns to the block 146 and the controller selects additional pairs for presentation in the event that the time of the current session is not up as illustrated by block 198.

In the event that the moving error average exceeds the short term error threshold and the time is not up, as shown by block 200, the controller determines whether the short-term error has exceeded the long-term error threshold more than a predetermined number of times as illustrated by block 202. In the event that the moving average of the user's errors exceeded the long-term error threshold more than that predetermined number of times, the controller stops processing, suggesting that a rest be taken to allow mental recovery. In the event that the short-term error was not exceeded more than a predetermined number of times, the controller returns to the block 146 and selects additional pairs/units for presentation. In the event that the controller had not yet finished presenting all of the pairs selected for presentation but the user's error average exceeded the short-term error threshold and the time is not yet up as illustrated by a block 204, processing branches to block 206 and the controller determines whether the short-term error threshold has been exceeded more than the long-term error threshold. In the event that it has not, processing branches to the block 160 and the controller continues presenting pairs already selected, and in the event that the time has elapsed, processing branches to the block 146, and the controller selects easier pairs and/or units for presentation.

Many modifications of the presently disclosed invention will become apparent to those skilled in the art so that the scope of the invention should not be limited by the preferred and exemplary embodiments but only by the appended claims.

What is claimed is:

1. An audio interactive tutor, comprising:

a course of study means for specifying what items of knowledge constitute the domain of knowledge to be learned as a first data structure defining audible stimulus and oral expected response pairs related in a first predetermined manner such that for each stimulus response pair the user would demonstrate correct knowledge of an item of knowledge to be learned should the user orally give the response expected;

said course of study means also for specifying the phases of memory retention that must be passed through before any item can be determined to have been retained fully in human memory as a second data structure defining a memory retention hierarchy ordered into two series, one series representing memory phases whereat any item is still not current in human memory and the other representing memory phases whereat any item is already current in human memory, each of the phases of the two series indexing practice intervals in such a way that some phases and practice intervals call for comparatively more intensive repetition to allow any item to become current in human memory by repetition at the corresponding, comparatively more intensive practice intervals and other phases and practice intervals call for comparatively less intensive repetition to allow any item that is already current in human memory to be refreshed in memory by repetition at the corresponding comparatively less intensive practice interval;

said course of study means also for specifying the manner that memory retention phases for particular items are to be changed based on the history of the way the user demonstrates correct and incorrect knowledge of items of knowledge to be learned as third and fourth data structures;

said third data structure defining a second predetermined manner that memory retention phases are to be assigned in the event that the user shall demonstrate correct knowledge of an item of knowledge and said fourth data structure defining a third predetermined manner that memory retention phases are to be assigned in the event that the user shall demonstrate incorrect knowledge of an item of knowledge;

said course of study means also for specifying the manner that instruction is to be structured as a fifth data structure defining a fourth predetermined manner by which at least one stimulus and response pair is to be selected for presentation based on the memory retention phases assigned to the items;

user model means for specifying which items of knowledge the user has already demonstrated correct and incorrect knowledge of and the phase of memory retention for each item already attained by the user as a sixth data structure defining for each item to be learned and retained in memory both the date and time that that item was last exercised and the memory retention phase and associated practice interval last attained;

audio output means for playing audio representative of a selected stimulus;

voice recognition means for recognizing whether the user's oral response corresponds to the response expected for the selected stimulus; and controller means coupled to the course of study means, the user model means, the audio output means and the voice recognition means for selecting in said fourth predetermined manner said predetermined number of stimulus and response pairs, for audibly presenting the stimulus associated with each pair selected via the audio output means and, responsive to whether the user's oral reply corresponds or not to the response expected for each stimulus, for updating in said second and third predetermined ways the sixth data structure of the user model means to reflect the current state of memory retention of the items of knowledge that the user has demonstrated correct and incorrect knowledge of.

2. The invention of claim 1, wherein said user model means further includes means for specifying an error parameter representative of the number of times the user demonstrates incorrect knowledge of at least one item.

3. The invention of claim 2, wherein said error parameter is a moving error average.

4. The invention of claim 1, wherein said stimulus and response pairs related in said first predetermined way are related as stand-alone pairs.

5. The invention of claim 1, wherein said stimulus and response pairs related in said first predetermined way are related as units, which units represent groups of stimulus and response pairs that belong together to teach some block of knowledge.

6. The invention of claim 1, wherein said second predetermined manner that memory retention phases are to be assigned in the event that the user shall demonstrate correct knowledge of any item of knowledge serially increments memory phases.

7. The invention of claim 1, wherein said third predetermined manner that memory retention phases are to be assigned in the event that the user shall demonstrate incorrect knowledge of an item of knowledge decrements the memory phases by a jumped change in phases such that if the present phase of an item is a higher phase on either of the higher or lower series, it changes to the lowest phase on that series and skips any intermediate phase and, if the present phase of the item is the lowest phase on the lower series, it jumps to a null phase, and, in the event the present phase is the lowest phase of the higher series it jumps to the lowest phase of the lower series.

8. The invention of claim 1, wherein said fourth predetermined manner is assigning a value that is representative of presentation utility.

9. The invention of claim 8, wherein said fourth predetermined manner assigns a utility magnitude to each of said stimulus and response pairs related in said first predetermined manner, said utility magnitude representative of the utility of presenting the items corresponding to the stimulus and response pairs.

10. The invention of claim 9, wherein the utility magnitude is calculated for every time said stimulus and response pairs are to be presented.

11. The invention of claim 9, wherein said utility magnitude is incrementally calculated only for items whose memory retention phases have changed since the last calculation.

12. Computer apparatus enabling a controller to which an audio output module and audio input module are operatively associated to operate as an audio interactive tutor that simulates an intelligent instructional dialogue that allows a user to learn items of knowledge of some domain of knowledge to be learned, comprising:

a course of study means for specifying what items of knowledge constitute the domain of knowledge to be learned as a first data structure defining audible stimulus and oral expected response pairs related in a first predetermined manner such that for each stimulus response pair the user would demonstrate correct knowledge of an item of knowledge to be learned should the user orally give the response expected;

said course of study means also for specifying the phases of learning and memory retention that must be passed through before the items can be determined to have been retained fully in human memory as a second data structure defining a memory retention hierarchy ordered into two series, one series representing memory phases whereat any item is still not current in human memory and the other representing memory phases whereat any item is already current in human memory, each of the phases of the two series indexing practice intervals in such a way that some phases and practice intervals call for comparatively more intensive repetition to allow any item to become current in human memory by repetition at the corresponding comparatively more intensive practice interval and other phases and practice intervals call for comparatively less intensive repetition to allow any item that is already current in human memory to be refreshed in memory by repetition at the corresponding comparatively less intensive practice interval;

said course of study means also for specifying the manner that memory retention phases for particular items are to be changed based on the history of the way the user demonstrates correct and incorrect knowledge of items to be learned as third and fourth data structures;

said third data structure defining a second predetermined manner that memory retention phases are to be assigned in the event that the user shall demonstrate correct knowledge of an item of knowledge and said fourth data structure defining a third predetermined manner that memory retention phases are to be assigned in the event that the user shall demonstrate incorrect knowledge of an item of knowledge;

said course of study means also for specifying the manner that instruction is to be structured as a fifth data structure defining a fourth predetermined manner by which at least one stimulus and response pair is to be chosen for presentation based on the memory retention phases assigned to the items;

user model means for specifying which items of knowledge the user has already demonstrated correct and incorrect knowledge of and the phase of knowledge and memory retention for each item already attained by the user as a sixth data structure defining for each item to be learned and retained in memory both the date and time that that item was last exercised and the memory retention phase and associated practice interval last attained; and a controller coupled to said course of study means and said user model means for controlling the audio output module to play audio representative of a selected stimulus.

13. The invention of claim 12, wherein said user model means further includes means for specifying an error parameter representative of the number of times the user demonstrates incorrect knowledge of at least one item.

14. The invention of claim 12, wherein said error parameter is a moving error average.

15. The invention of claim 13, wherein said oral stimulus and response pairs related in said first predetermined way are related as stand-alone pairs.

16. The invention of claim 13, wherein said stimulus and response pairs related in said first predetermined way are related as units, which units represent groups of stimulus and response pairs that belong together to teach some block of knowledge.

17. The invention of claim 13, wherein said second predetermined manner that memory retention phases are to be assigned in the event that the user shall demonstrate correct knowledge of any item of knowledge serially increments memory phases.

18. The invention of claim 13, wherein said third predetermined manner that memory retention phases are to be assigned in the event that the user shall demonstrate incorrect knowledge of an item of knowledge decrements the memory by a jumped change in phases such that if the present phase of an item is a higher phase on either of the higher or lower series, it changes to the lowest phase on that series and skips any intermediate phase and, if the present phase of the item is the lowest phase on the lower series, it jumps to a null phase, and, in the event the present phase is the lowest phase of the higher series it jumps to the lowest phase of the lower series.

19. The invention of claim 13, wherein said fourth predetermined manner is assigning a utility value that is representative of presentation utility.

20. The invention of claim 13, wherein said fourth predetermined manner assigns a utility magnitude to each of said stimulus and response pairs related in said first predetermined manner, said utility magnitude representative of the utility of presenting the items corresponding to the stimulus and response pairs.

21. The invention of claim 13, wherein the utility magnitude is calculated for every time said stimulus and response pairs are to be presented.

22. The invention of claim 13 wherein said utility magnitude is incrementally calculated only for items whose memory retention phases have changed since the last calculation.

* * * * *